(12) United States Patent
Dhong et al.

(10) Patent No.: US 6,430,672 B1
(45) Date of Patent: Aug. 6, 2002

(54) METHOD FOR PERFORMING ADDRESS MAPPING USING TWO LOOKUP TABLES

(75) Inventors: Sang Hoo Dhong; Harm Peter Hofstee, both of Austin; Osamu Takahashi, Round Rock, all of TX (US); Jan van Lunteren, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 09/617,829

(22) Filed: Jul. 17, 2000

(51) Int. Cl.[7] .............................................. G06F 12/10
(52) U.S. Cl. .......................... 711/220; 711/5; 711/202; 711/206; 711/208; 711/209
(58) Field of Search .............................. 711/5, 200, 202, 711/206, 207, 208, 209, 220

(56) References Cited

U.S. PATENT DOCUMENTS

| | | | | |
|---|---|---|---|---|
| 4,654,777 A | * | 3/1987 | Nakamura | 711/206 |
| 4,692,879 A | * | 9/1987 | Ikuta | 395/115 |
| 5,333,289 A | * | 7/1994 | Kaneko et al. | |
| 5,937,435 A | * | 8/1999 | Dobbek et al. | 711/202 |
| 5,963,983 A | * | 10/1999 | Sakakura et al. | 711/202 |
| 6,046,996 A | * | 4/2000 | Hoshino et al. | 370/392 |
| 6,185,674 B1 | * | 2/2001 | Chan et al. | 712/230 |
| 6,289,014 B1 | * | 9/2001 | Hoshino et al. | 370/392 |

FOREIGN PATENT DOCUMENTS

WO          WO 98/43168          * 10/1998

OTHER PUBLICATIONS

J. Van Lunteren, "Towards Memory Centric Computing: A Flexible Address Mapping Scheme", IBM Research Division, 6 pp.*

* cited by examiner

*Primary Examiner*—B. James Peikari
(74) *Attorney, Agent, or Firm*—Casimer K. Salys; Bracewell & Patterson, L.L.P.

(57) ABSTRACT

A method for performing address mapping for a memory within a computer system is disclosed. The memory is organized in multiple of memory banks, and each memory bank is identified by a respective bank number. A block address portion of a physical address is translated to a corresponding bank number and an associated internal bank address. The bank number is formed by concatenating an output from a first lookup table and an output from a second lookup table. The output from the first lookup table is obtained by a first and a second segments of the block address portion, while the output from the second lookup table is obtained by a third and a fourth segments of the block address portion. Data stored in a specific location within the memory banks can be accessed by the bank number and the associated internal bank address.

12 Claims, 5 Drawing Sheets

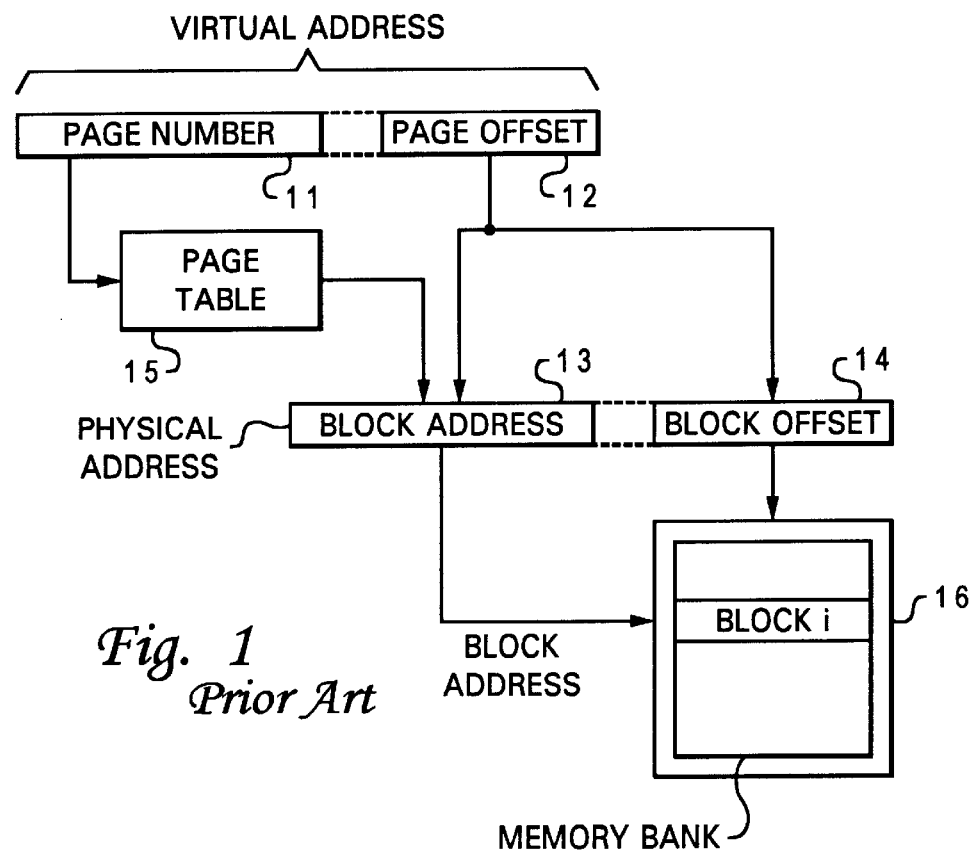
Fig. 1 *Prior Art*
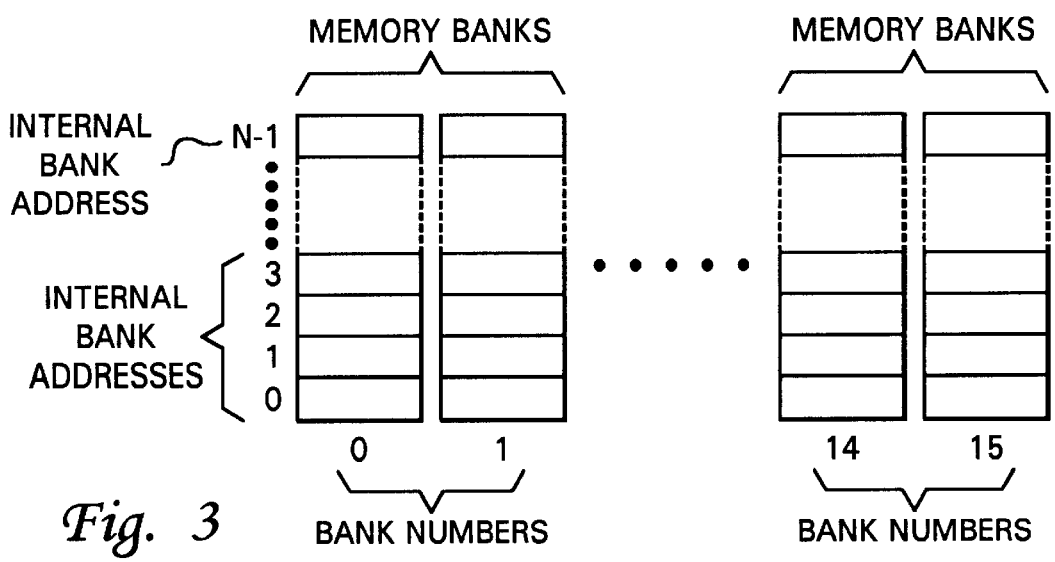
Fig. 3

METHOD FOR PERFORMING ADDRESS MAPPING USING TWO LOOKUP TABLES

RELATED PATENT APPLICATION

The present patent application is related to a copending application U.S. Ser. No. 09/194,275, filed on Nov. 20, 1998, entitled "ADDRESS MAPPING FOR SYSTEM MEMORY", the content of which is incorporated herein by reference.

BACKGROUND OF THE INVENTION

1. Technical Field

The present invention relates to a method for data processing in general, and in particular to a method for performing address mapping for a system memory. Still more particularly, the present invention relates to a method for performing address mapping to access information stored in a system memory within a computer system.

2. Description of the Prior Art

In a typical data processing system, information is typically loaded in a system memory at wherever free space is available. Thus, a virtual address of a block of information usually do not reflect where the physical address (or actual address) in the system memory in which the information is actually stored.

The physical address space is considered as a contiguous space. Each physical address corresponds to a storage location in a memory bank within a system memory. A line is the part of a memory bank that consists of a number of storage locations that can be addressed as a whole by a line-number or bank-internal address. A block consists of one line or multiple lines. The physical addresses, that are assigned to storage locations contained within one block, are only different from each other by several least significant address bits called a block offset. The most significant address bits of a physical address constitute a block address, and they are identical for the same block. If a block includes one line, and a line consists of one storage location, then the block address equals the physical address.

Accordingly, a virtual address can be translated into a physical address by a translation process graphically illustrated in FIG. 1. As shown, a virtual address includes a page number 11 and a page offset 12. Page offset 12 represents a certain point within a page. Page number 11 and page offset 12 are then translated into a block address 13 and a block offset 14. Block offset 14 represents a certain point within a block. Usually, the least significant bits of page offset 12 are used as block offset 14, and the remaining bits of page offset 12 are used as the least significant bits for block address 13. The most significant bits of block address 13 are obtained by translating page number 11 via a page table 15. Page table 15 is updated each time new information is loaded into a memory. In a data processing system having only one memory bank 16, FIG. 1 represents the entire process of addressing a predetermined block i within memory bank 16.

A system memory typically have more than one memory bank. If blocks of data having consecutive block addresses are mapped on lines within the same memory bank, then a problem occurs if they have to be accessed in the same sequence. This is because after an access has been made to one line of a memory bank, the memory bank usually needs a short period of time to "recover" before another access can be made. Hence, consecutive block address accesses would require more time than is desirable.

One solution to the above-mentioned problem is to interleave data in different memory banks that can be separately accessed. Thus, if storage locations with consecutive block addresses are distributed over separate memory banks, the blocks can be accessed one memory bank immediately after the other without any wait time. The simplest way to do this is to use one portion of the block address as the memory bank number and the rest of the block address as line-number (or bank-internal address), as graphically shown in FIG. 2. With this method, the distribution of consecutive block. addresses over a system memory 20 is bank-wise, and the overall access time is much improved in many cases.

However, this known method requires that the number of memory banks within system memory 20 to be a power of two, and that the interleaving be uniform (i.e., sequential), which is not optimal in various applications. Generally speaking, sequential accesses to a memory, such as system memory 20, are not randomly distributed but follow a certain pattern, depending on the type of applications. Thus, even if data is stored in an interleaved manner in several memory banks, such as system memory 20 shown in FIG. 2, sequential accesses for consecutive block addresses may occur at the same memory bank.

Ideally, memory accesses should be distributed uniformly over all memory banks in order to achieve best performance. To that end, various interleaving schemes, such as prime degree interleaving, pseudo-random interleaving, irreducible interleaving, etc., have been developed over the years for handling the memory distribution problem, specifically related to scientific applications. However, with these prior art interleaving schemes, address mapping often involves complex calculations that also lead to relatively large memory latencies. Consequently, it would be desirable to provide an improved method for performing address mapping to access information stored in a memory.

SUMMARY OF THE INVENTION

In accordance with a preferred embodiment of the present invention, a memory is organized in multiple of memory banks, and each memory bank is identified by a respective bank number. A block address portion of a physical address is translated to a corresponding bank number and an associated internal bank address. The bank number is formed by concatenating an output from a first lookup table and an output from a second lookup table. The output from the first lookup table is obtained by a first and a second segments of the block address portion, while the output from the second lookup table is obtained by a third and a fourth segments of the block address portion. Data stored in a specific location within the memory banks can be accessed by the bank number and the associated internal bank address.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 1 graphically illustrates a virtual address to a physical address translation;

FIG. 3 graphically depicts a system memory having multiple memory banks in which a preferred embodiment of the present invention can be implemented;

FIGS. 6A and 6B illustrates the hierarchical mapping function, in accordance with a preferred embodiment of the present invention.

DETAILED DESCRIPTION OF A PREFERRED EMBODIMENT

I. Definitions

The following definitions are provided to clarify the meaning of terms as they are used herein.

Virtual address=an address as used in a program

Physical address=an address uniquely identifying a position in a memory (as obtained via a table lookaside operation)

Memory bank=a group of memory that can be separately accessed (also called memory module)

Location=a storage place that can be separately addressed, usually in a byte or a word Line=a portion of a memory bank handled as a whole and addressed as a whole, often in a power of two locations Block=a portion of memory handled as a whole (in a given context) and addressed as a whole, it may be one line or multiple lines Stride=an address sequence, $a_0, a_1, a_2, a_3, \ldots$, has a stride S when for each two succeeding addresses holds: $a_{i+1} = a_i + S$ (i.e., the address sequence is $a_0, a_0+S, a_0+2S, a_0+3S, \ldots$)

Interleave factor=an average number of memory banks that can be accessed in parallel when accessing the addresses of the address sequence in the given order for an address sequence, $a_0, a_1, a_2, a_3, \ldots$

II. An Exemplary System Memory

Referring now to FIG. 3, there is graphically illustrated a system memory with sixteen memory banks in which a preferred embodiment of the present invention can be implemented. As shown, each box represents one memory block. Multiple memory blocks shown in each column constitute a memory bank. In this embodiment, each memory bank is numbered consecutively from 0 to 15. Each of the memory banks 0–16 has N internal bank addresses (or line numbers).

III. Mapping Scheme

Figure 2:
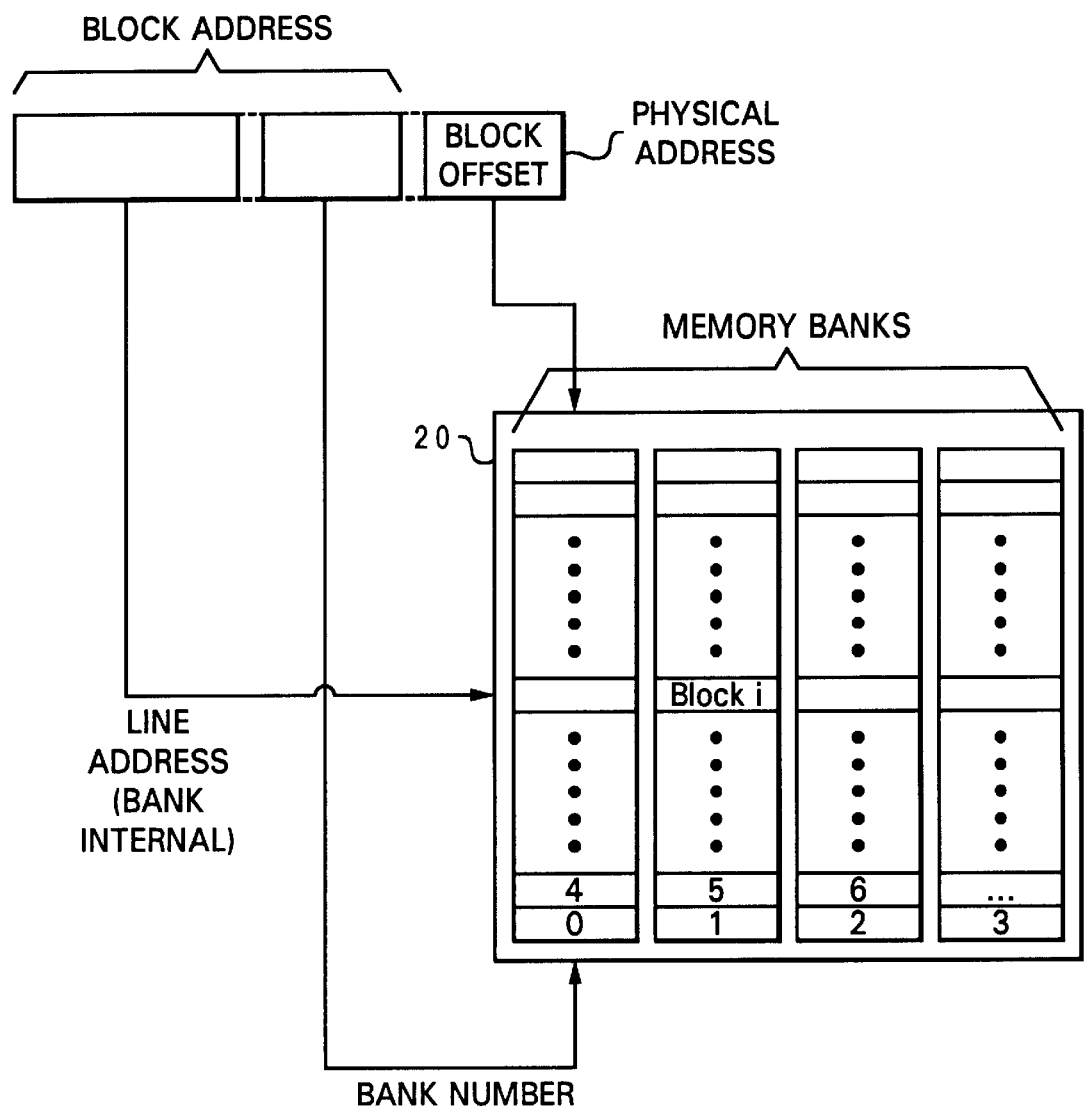
FIG. 2 graphically illustrates an interleaving scheme according to the prior art.
Figure 4:
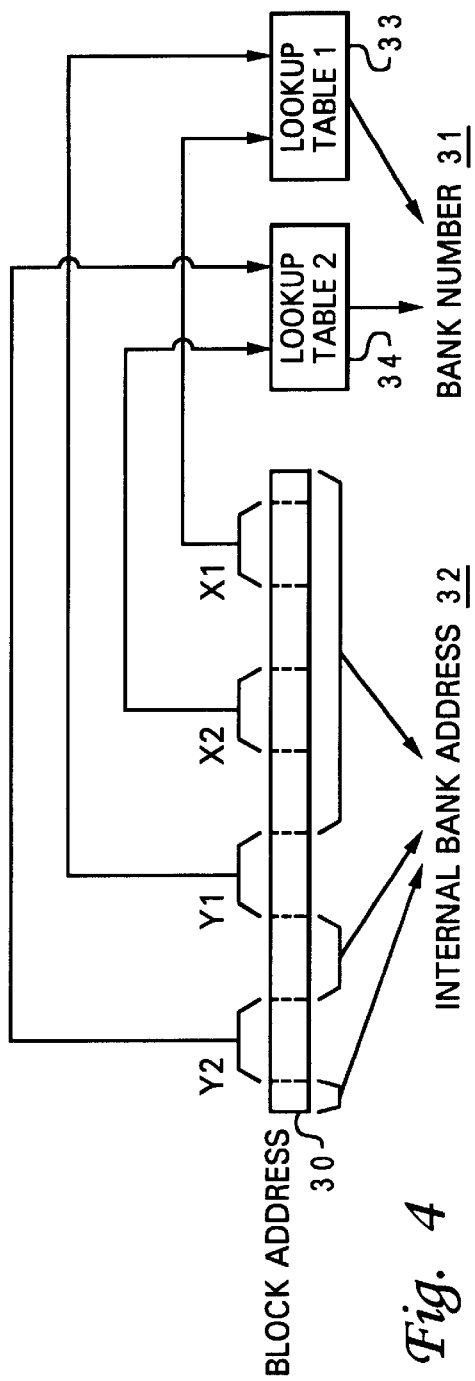
FIG. 4 graphically depicts a block address for accessing information stored in the system memory from FIG. 3, in accordance with a preferred embodiment of the present invention.

With reference now to FIG. 4, there is graphically illustrated a block address for accessing (i.e., reading or writing) information in the system memory from FIG. 3, in accordance with a preferred embodiment of the present invention. As shown, a block address 30 of a physical address is used to access a memory bank within the system memory from FIG. 3 via a bank number 31 and an internal bank address 32 (i.e., an address within the selected bank). As a preferred embodiment of the present invention, four separate portions, namely, X1, Y1, X2, and Y2 are selected from block address 30 to form bank number 31. Specifically, X1 and Y1 are used as indices to access a first lookup table 33, and X2 and Y2 are used as indices to access a second lookup table 34. In this embodiment, the output of lookup table 33 is utilized to form the least significant bits of bank number 31, and the output of lookup table 34 is utilized to form the most significant bits of bank number 31. After a specific memory bank has been identified (i.e., a bank number has been issued by lookup tables 33 and 34), block address 30 without the Y1 and Y2 portions is used to form internal bank address 32 for accessing the identified memory bank.

IV. Lookup Tables

Figure 5:
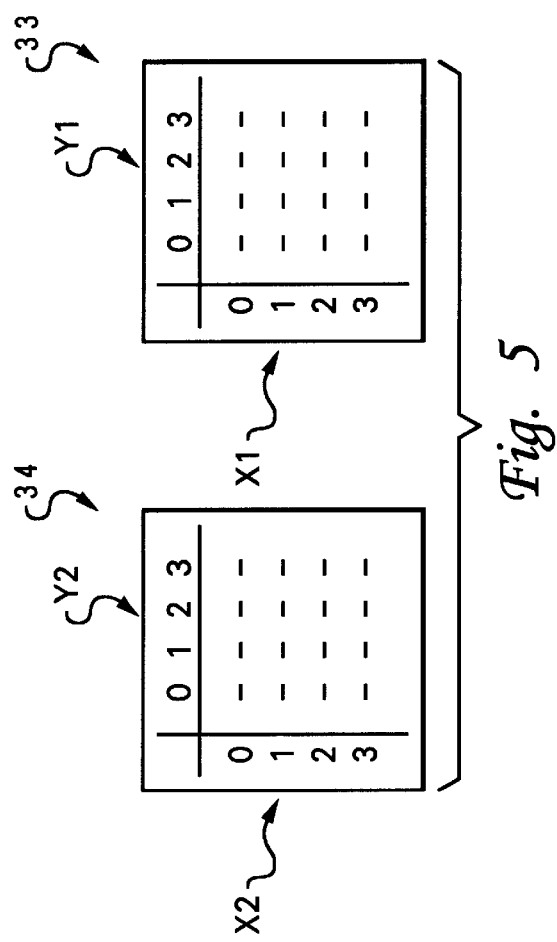
FIG. 5 graphically depicts two lookup tables for accessing the system memory from FIG. 3, in accordance with a preferred embodiment of the present invention.

Referring now to FIG. 5, there is illustrated a detailed block diagram of lookup tables 33 and 34 for accessing information in the system memory from FIG. 3, in accordance with a preferred embodiment of the present invention. Both lookup tables 33, 34 have four rows and four columns. Accordingly, each of X1, X2, Y1, and Y2 has two bits so that four rows and four columns can be distinguished. Each position within lookup tables 33, 34 contains a number that can be utilized to form a bank number for addressing a corresponding memory bank for a given block address. As mentioned previously, the output of lookup table 33 is utilized to form the least significant bits of a bank number, and the output of lookup table 34 is utilized to form the most significant bits of the bank number.

The contents of lookup tables 33, 34 can be selected completely independent from each other. The main condition for filling each of lookup tables 33, 34 is that each row is not allowed to contain the same value more than once. Furthermore, for each of lookup tables 33, 34, the X field and the Y field do not need to cover adjacent bit locations but can be comprised of bits that are arbitrarily located within the address that is to be mapped if the following two conditions are met:

1) the X field and the Y field that correspond to the same lookup table have to be disjoint; and
2) the Y fields that correspond to different lookup tables have to be disjoint.

An X field corresponding to a certain lookup table can share bits with the X and Y fields of any other lookup table.

V. Mapping Examples

Figure 6A:
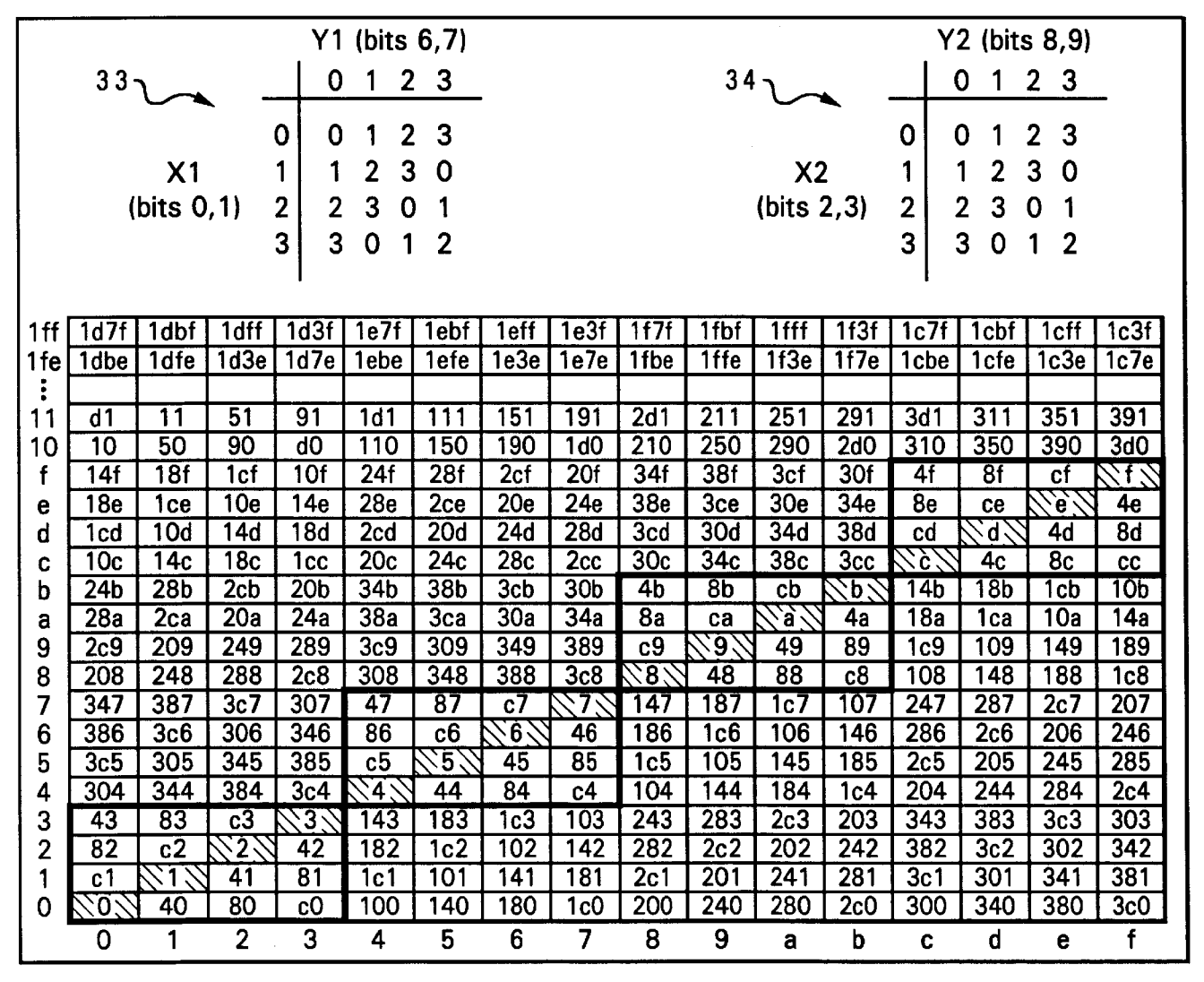
Figure 6B:
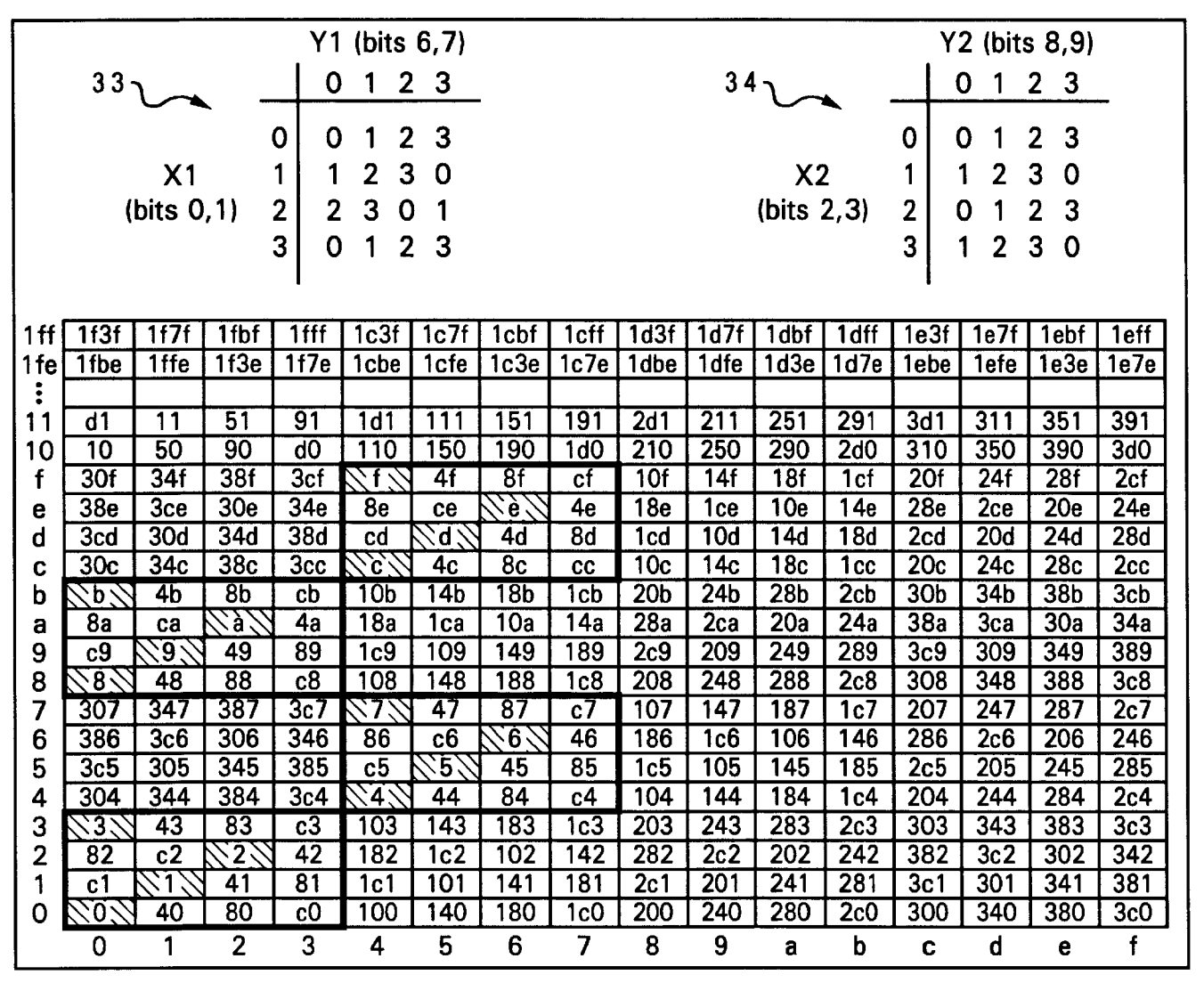

The mapping examples in FIG. 6A and FIG. 6B are used to explain the hierarchical mapping function of the present invention. For ease of explanation, the following four sets of addresses are assigned to have all addresses Be within a single set to be different from each other only in the X1 field or Y1 field:

1) 0,1,2,3,40,41,42,43,80,81,82,83,c0,c1,c2,c3
2) 4,5,6,7,44,45,46,47,84,85,86,87,c4,c5,c6,c7
3) 8,9,a,b,48,49,4a,4b,88,89,8a,8b,c8,c9,ca,cb
4) c,d,e,f,4c,4d,4e,4f,8c,8d,8e,8f,cc,cd,ce,cf

In addition, four addresses taken from the four respective sets have consecutive values for the X2 field. Furthermore, bits 0–1 of block address 30 are utilized as X1, and bits 6–7 of block address 30 are utilized as Y1 for indexing lookup table 33, while bits 2–3 of block address 30 are utilized as X2, and bits 8–9 of block address 30 are utilized as Y2 for indexing lookup table 34.

In FIG. 6A, address sequences with power-of-two strides 1 and $40_{hex}$ are interleaved over sixteen memory banks via block address 30. The memory locations upon which the above address sets are mapped, are marked by thick rectangles. The mapping of the addresses of an individual set upon the memory locations within one rectangle is determined by lookup table 33 that is indexed by the X1 and Y1 fields, which provides the two least significant bits of the bank number. In FIG. 6A, the addresses 0, 1, 2, 3 have consecutive X1 field values and a Y1 field value equals zero. Consequently, these addresses are mapped according to the first column of lookup table 34 over the sixteen memory banks. The mapping in FIG. 6A involves a distribution of addresses 0, 1, 2, 3 over all four memory banks within a thick rectangle whereas in FIG. 6B, the same addresses are mapped over three memory banks within the thick rectangle.

Lookup table 34 that is indexed by the X2 and Y2 are fields provides the most significant bits of the bank number. Therefore, the output of lookup table 34 determines how each of the thick rectangles are mapped over the four sets of four adjacent memory banks as they appear in the example (i.e., banks 0, 1, 2, 3, banks 4, 5, 6, 7, banks 8, 9, a, b, and banks c, d, e, f). The four above-mentioned address sets have consecutive X2 field values and a Y2 field value equals zero. Therefore, these sets are mapped according to the first column of lookup table 34. In FIG. 6A, the four rectangles are mapped over all four groups of four adjacent memory banks (i.e., mapped over all sixteen memory banks), and in FIG. 6B, the four rectangles are mapped only over two groups of four adjacent memory banks (i.e., mapped over only eight of the sixteen memory banks).

Both lookup tables 33, 34 can be provided as a separately addressable circuitry, either read-only or loadable with the respective conversion table, in the memory controller of the system. Lookup tables 33, 34 can also be provided within a processor. If different lookup table-pairs are to be used for different applications, the lookup table-pairs can either be provided as multiple read-only tables (selected according to the active application), or they can be loaded as required into a table memory circuit at the beginning of a respective application.

As has been described, the present invention provides an improved method for performing address mapping to access, which includes reading and writing, information in a system memory. Although a memory, having sixteen banks of memory, is utilized to illustrate the present invention, it is understood by those skilled in the art that the present invention can be implemented with a memory having any number of memory banks by adjusting the number of bits within each of the lookup tables.

While the invention has been particularly shown and described with reference to a preferred embodiment, it will be understood by those skilled in the art that various changes in form and detail may be made therein without departing from the spirit and scope of the invention.

What is claimed is:

1. A method for accessing information in a memory having a plurality of memory banks, wherein each of said plurality of memory banks is identified by a respective bank number, said method comprising the steps of:

translating a block address portion of a physical address to a corresponding bank number and an associated internal bank address, wherein said bank number is formed by concatenating an output from a first lookup table and an output from a second lookup table, wherein said output from said first lookup table is obtained by a first and a second segments of said block address portion, while said output from said second lookup table is obtained by a third and a fourth segments of said block address portion; and accessing data stored in a specific location within said plurality of memory banks via said bank number and said associated internal bank address.

2. The method according to claim 1, wherein said first and third segments of said block address portion are in less significant bit positions than said second and fourth segments of said block address portion.

3. The method according to claim 1, wherein said output from said first lookup table forms the least significant bits of said bank number, and said output from said second lookup table forms the most significant bits of said bank number.

4. The method according to claim 1, wherein said associated internal bank address is formed by removing said second and fourth segments from said block address portion.

5. The method according to claim 1, wherein a value in each row of said lookup tables is unique for that row.

6. The method according to claim 1, for each of said lookup tables, an X field and an Y field do not need to cover adjacent bit locations but can be comprised of bits that are arbitrarily located within the address that is to be mapped if the following two conditions are met:

a) X field and Y field that correspond to the same lookup table have to be disjoint; and b) Y fields that correspond to different lookup tables have to be disjoint.

7. A memory having a plurality of memory banks, wherein each of said plurality of memory banks is identified by a respective bank number, said apparatus comprising:

a first lookup table and a second lookup table;

means for translating a block address portion of a physical address to a corresponding bank number and an associated internal bank address, wherein said bank number is formed by concatenating an output from said first lookup table and an output from said second lookup table, wherein said output from said first lookup table is obtained by a first and second segments of said block address portion, while said output from said second lookup table is obtained by a third and fourth segments of said block address portion; and means for accessing data stored in a specific location within said plurality of memory banks via said bank number and said associated internal bank address.

8. The memory according to claim 7, wherein said first and third segments of said block address portion are in less significant bit positions than said second and fourth segments of said block address portion.

9. The memory according to claim 7, wherein said output from said first lookup table forms the least significant bits of said bank number, and said output from said second lookup table forms the most significant bits of said bank number.

10. The memory according to claim 7, wherein said associated internal bank address is formed by removing said second and fourth segments from said block address portion.

11. The memory according to claim 7, wherein a value in each row of said lookup tables is unique for that row.

12. The memory according to claim 7, for each of said lookup tables, an X field and an Y field do not need to cover adjacent bit locations but can be comprised of bits that are arbitrarily located within the address that is to be mapped if the following two conditions are met:

a) X field and Y field that correspond to the same lookup table have to be disjoint; and b) Y fields that correspond to different lookup tables have to be disjoint.

* * * * *